United States Patent
McLean et al.

(10) Patent No.: US 8,106,613 B2
(45) Date of Patent: Jan. 31, 2012

(54) BRUSHLESS MOTOR DRIVE

(75) Inventors: Andrew McLean, Warley (GB); John Anthony Bolton, Tamworth (GB)

(73) Assignee: TRW Limited (GB)

( * ) Notice: Subject to any disclaimer, the term of this patent is extended or adjusted under 35 U.S.C. 154(b) by 226 days.

(21) Appl. No.: 11/990,662

(22) PCT Filed: Aug. 16, 2006

(86) PCT No.: PCT/GB2006/003056
§ 371 (c)(1),
(2), (4) Date: Nov. 18, 2009

(87) PCT Pub. No.: WO2007/023257
PCT Pub. Date: Mar. 1, 2007

(65) Prior Publication Data
US 2010/0066285 A1    Mar. 18, 2010

(30) Foreign Application Priority Data
Aug. 20, 2005    (GB) .................................. 0517163.2

(51) Int. Cl.
*H02M 7/66* (2006.01)
*H02P 27/06* (2006.01)

(52) U.S. Cl. ............ 318/400.29; 318/400.26; 318/400.3

(58) Field of Classification Search .................. 318/700, 318/400.03, 400.27, 400.28, 400.29, 720–724, 318/400.26, 400.3
See application file for complete search history.

(56) References Cited

U.S. PATENT DOCUMENTS

| | | | |
|---|---|---|---|
| 3,942,091 A | 3/1976 | Weibelzahl | |
| 3,986,097 A * | 10/1976 | Woods | 363/22 |
| 4,257,087 A | 3/1981 | Ćuk | |
| 4,729,087 A | 3/1988 | Trumpler et al. | |
| 4,772,994 A * | 9/1988 | Harada et al. | 363/8 |
| 5,019,770 A * | 5/1991 | Harada et al. | 323/282 |
| 5,260,607 A * | 11/1993 | Kinbara | 327/427 |
| 5,442,539 A * | 8/1995 | Cuk et al. | 363/89 |
| 5,570,279 A | 10/1996 | Venkataramanan | |
| 5,737,203 A * | 4/1998 | Barrett | 363/75 |
| 6,058,032 A | 5/2000 | Yamanaka et al. | |
| 6,294,900 B1 * | 9/2001 | Greenwood et al. | 323/222 |
| 2002/0125854 A1 * | 9/2002 | Williamson | 318/727 |
| 2006/0267527 A1 * | 11/2006 | Khopkar et al. | 318/254 |

FOREIGN PATENT DOCUMENTS

| | | |
|---|---|---|
| EP | 0613234 A1 | 8/1994 |
| EP | 1 561 670 A2 | 8/2005 |
| EP | 1561670 A2 | 8/2005 |
| GB | 2110012 A | 6/1983 |

* cited by examiner

OTHER PUBLICATIONS

Great Britain Search Report for Application No. GB0517163.2 dated Nov. 3, 2005. International Search Report for PCT/GB2006/003056 dated Jan. 2, 2007.

*Primary Examiner* — Bentsu Ro
(74) *Attorney, Agent, or Firm* — MacMillan, Sobanski & Todd, LLC

(57) ABSTRACT

A drive circuit for a motor having a plurality of phases, comprising an input for a DC signal and a plurality of phase outputs, the circuit being arranged to provide at each of the phase outputs, in use, current to one phase of the motor, in which there is provided a converter for each phase output, each converter being arranged to take as an input a DC signal and output an signal having an AC component with a higher voltage magnitude than that of the DC signal input to the converter. Typically, the converters comprise Ćuk converters.

15 Claims, 4 Drawing Sheets

BRUSHLESS MOTOR DRIVE

CROSS-REFERENCE TO RELATED APPLICATIONS

This application is a National Stage of International Application No. PCT/GB2006/003056 filed Aug. 16, 2006, the disclosures of which are incorporated herein by reference, and which claimed priority to Great Britain Patent Application No. 0517163.2 filed Aug. 20, 2005, the disclosures of which are incorporated herein by reference.

BACKGROUND OF THE INVENTION

This invention relates to drive circuits for motors having a plurality of phases, especially but non-exclusively for those for use in Electric Power Assisted Steering (EPAS) systems.

Electric Power Assisted Steering systems are well known in the prior art. The power generated by an electric motor is used to generate an assistance torque in the steering column in the same direction as a detected demand torque generated by a driver of the vehicle turning a steering wheel. For example, a gearbox may provide a connection between the motor and a steering column shaft, or directly onto a portion of a rack and pinion mechanism forming part of the steering mechanism.

The electric motor is used to assist a driver in applying torque to the steering mechanism, by applying an assistance torque of the same sense, to make it easier to turn the steering wheel, for example during parking maneuvres. Thus, operation of the motor may assist in rotating the steering column shaft, or moving a portion of the steering rack mechanism. Of course, the motor may be connected to any part of any typical steering mechanism as long as it can provide an assistance torque to aid the driver in turning the steering wheel.

A typical permanent magnet electric motor used in an EPAS system comprises a rotor that is magnetic, for example including a permanent magnet, and a stator including a plurality of phase windings on a yoke. Applying suitable voltages across each of the phase windings causes current to flow through the windings, generating a current flux vector in the air gap between the stator and the rotor. This current flux vector interacts with the magnetic field of the rotor to cause the rotor to rotate to a point of equilibrium in which the current vector is aligned with the axis of the rotor magnetic field.

To cause the rotor to turn continuously, the current passed through the windings must be varied in a sequence. This causes the current flux vector to rotate. This can be achieved by modulating the voltages across each winding under the control of a motor drive circuit.

The motor may be controlled by motor control means comprising a drive circuit, which is operative to supply a current from a power supply to the motor phase windings. In one arrangement, each phase is connected to a positive terminal of the power supply by a top transistor, and to a negative terminal by a bottom transistor, the two transistors defining an arm of a multiple arm bridge. This bridge forms the drive circuit, while the control circuits are provided by a microprocessor or similar device.

The microprocessor is operative in response to signals from a torque sensor provided on the steering column to measure the torque applied by the driver, from a motor rotor position sensor providing information about motor speed and direction and optionally from signals corresponding to current flowing in the motor bridge or power supply. This information can be used in combination with the torque sensor signal and/or column position sensor signal to determine which phase winding should be energised and when. The microprocessor produces control signals which energise the transistors of the drive circuits to cause current to flow in a desired motor phase. Such a drive circuit can be seen in European Patent Application Publication number 0 857 135.

The torque developed in the motor is dependent firstly on the current passing through the windings, in a generally linear manner, and secondly on the phase of the current relative to the flux due to the rotor magnets.

The torque required from EPAS systems is increasing as vehicles become heavier and such systems are fitted to larger vehicles. The maximum torque generated by a multi-phase brushless motor is dependent on, amongst other factors, the supply voltage. It is known to boost the voltage from the battery using a voltage boost circuit. Such circuits enable the voltage to be temporarily boosted so that the effective voltage as applied to the motor phase terminals is higher than the basic battery voltage. However, as a higher voltage is then chopped by the bridges of the drive circuit, more shielding is required against electromagnetic (EM) radiation of the drive signals.

It is also known to advance the phase of the drive signals with respect to the rotor position in order to increase the torque generated by such a motor. However, this reduces the efficiency of the motor.

BRIEF SUMMARY OF THE INVENTION

According to a first aspect of the invention, there is provided a drive circuit for a motor having a plurality of phases, comprising an input for a DC signal and a plurality of phase outputs, the circuit being arranged to provide at each of the phase outputs, in use, current to one phase of the motor, in which there is provided a converter for each phase output, each converter being arranged to take as an input a DC signal and output an signal having an AC component with a higher voltage magnitude than that of the DC signal input to the converter.

By placing a separate converter in each phase, the DC signal input can be separately transformed into a boosted AC signal required to drive the motor. By doing so, it is not required to chop a boosted signal, and it is no longer necessary to boost then chop the voltage; we have appreciated that both steps can be carried out in the same converter in each phase rather than boosting the voltage first. Accordingly, the invention can provide a simpler, more convenient drive circuit that can generate drive signals with less electromagnetic emissions.

Each converter will typically comprise a switch, and the circuit may further comprise control means arranged to, in use, apply control signals to the switches of each of the converters. The control means may be arranged to switch the switches at a certain frequency, and may vary the duty ratio of such switching in order to generate the AC component. This is advantageous, as generating such pulse width modulated (PWM) signals is simple and well known in prior art. This contrasts to the prior art, in which PWM drive signals would be applied to the motor phases, thus leading to strong EM emissions due to the high current drive signals with sharp-edged waveforms.

The circuit may be arranged such that, in use, the signal output at each phase output comprises a DC offset; this is generally of no concern where the phases of the motor are arranged such that it is the difference in the voltages supplied to each phase that controls the current flow through each phase, such as in the case of a star-wound or delta-wound motor. The DC offset generated may be the same for each phase output. In an alternative, there may be no DC offset.

The control means may further comprise an input for a torque demand signal indicative of an amount of torque to be generated by the motor, and be arranged to vary the duty ratio of the switching of the switch in order to change the amplitude of the AC component, in response to a change in the torque demand signal.

Each converter may comprise a Ćuk converter. These are particularly useful, as such a converter can typically generate an output signal of higher voltage than its input without generating ripple on the input or the output. This is therefore much preferable than chopping the boosted DC signal, as less electrical noise will be generated and passed back to the DC supply. This is important in automotive environments where other components powered off the same DC supply (that is, the vehicle battery and generator) may be sensitive to noise. Such a drive circuit may therefore require less electrical filtering; normally a large capacitor is required to filter out any noise that could be passed back to the DC supply.

As is well known in the prior art, each Ćuk converter may comprise an input inductance coupled to the input of the converter, an output inductance coupled to the output of the converter, and an energy storage capacitor coupled in series between the input and output inductances. In a preferred embodiment, the Ćuk converter further comprises a transformer coupled in series between the input and output inductances. This preferably and advantageously acts to isolate the input of the converter from the output; a short circuit in use of a phase of the motor to ground will no longer be passed back to the DC supply.

Where the transformer has an input winding coupled to the input inductance and an output winding coupled to the output inductance, the converter may comprise two energy storage capacitors, one coupled to the input winding and one to the output winding.

The input and output inductances may be wound on a common core. This enables the ripples on the current flowing on input and output to be balanced in a desired manner. Furthermore, the common core may also be the core of the transformer. By these means, the ripple of the current taken from the DC supply in use may be reduced to an insubstantial level or practically zero. The parts of the common core around which the input and output inductances are wound may have a gap therein.

The common core may be of the form of two parallel elongate side pieces with two end limbs extending between pairs of ends of the side pieces and a centre limb joining the side pieces at the centre of the side pieces. The output and input inductances may be wrapped around the end limbs, and the transformer windings may be wrapped about the centre limb. The end limbs may each comprise a gap.

Where the drive circuit is to be used with a three-phase motor, the drive circuit preferably comprises three phase outputs and three converters. This is the most common arrangement in EPAS system motors.

According to a second aspect of the invention, there is provided an Electric Power Assisted Steering (EPAS) system, comprising a DC voltage source, a motor having a plurality of phases and a drive circuit according to the first aspect of the invention, wherein the drive circuit is connected at its input to the DC voltage source and at each output to a phase of the motor.

Preferably, the drive circuit has one phase output per motor phase, each phase output being connected to a phase of the motor. Typically, the motor would have three phases, and would be permanent-magnet brushless AC motor.

Preferably, the EPAS system is installed in a vehicle, and the DC power supply is a vehicle battery.

Other advantages of this invention will become apparent to those skilled in the art from the following detailed description of the preferred embodiments, when read in light of the accompanying drawings.

DETAILED DESCRIPTION OF THE INVENTION

Figure 1:
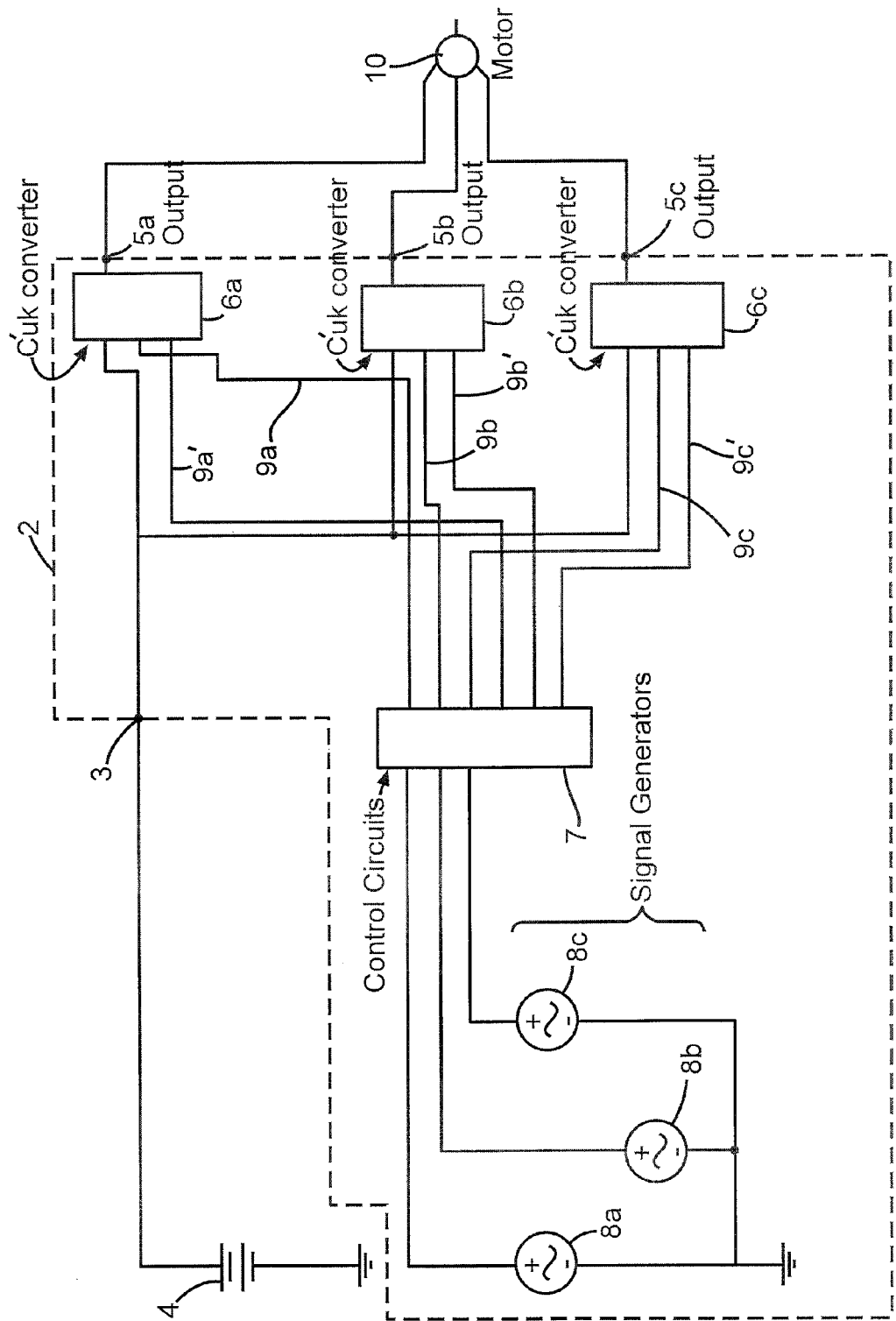
FIG. 1 shows an Electric Power Assisted Steering (EPAS) system with a drive circuit according to the present invention.

FIG. 1 shows a drive circuit 2 within an EPAS system 1 for a vehicle. The drive circuit 2 has an input 3 which takes current from a DC supply being the vehicle battery 4 and three outputs 5a, 5b, 5c which provide suitable voltages to drive a three-phase motor 10. The motor 10 is operatively coupled to a part of the steering mechanism of the vehicle (not shown) in order to provide assistance in steering the vehicle as appropriate.

Where equivalent devices are provided for each of the three phases of the motor, these have been designated by a common number with a suffix a, b or c indicating the phase.

The drive circuit comprises three Ćuk converters 6a, 6b, 6c each connected to the input 3 and one of the outputs 5a, 5b, 5c. The Ćuk converters are also connected to a control circuit 7, which generates from three signal generators 8a, 8b, 8c set of control signals 9a, 9a', 9b, 9b', 9c and 9c' which are applied in pairs to the Ćuk converters. The pair of signals applied to each converter—that is 9a and 9a', 9b and 9b', and 9c and 9c'—are the complement to each other, in that when one is high, the other is low. Ćuk converters are known in the prior art; their operation is described in United Kingdom Patent Publication number 2 006 552.

Figure 2:
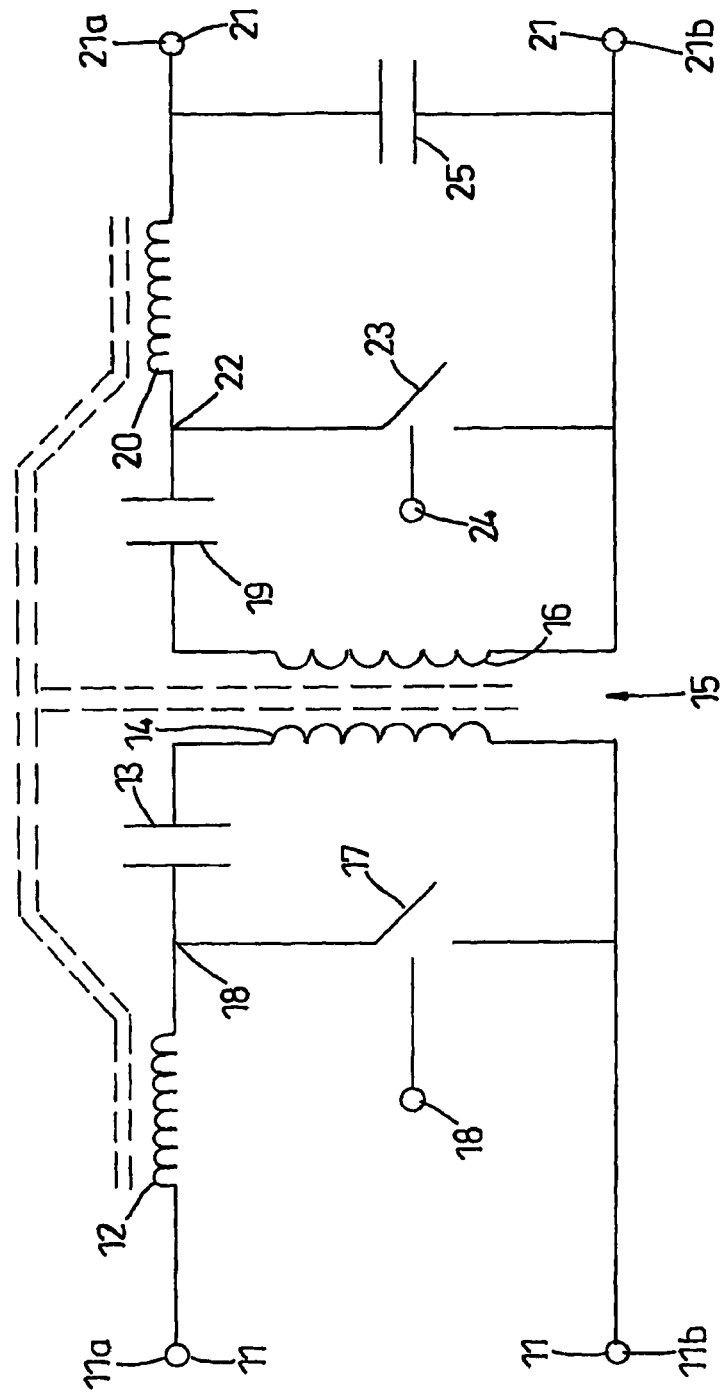
FIG. 2 shows a Ćuk converter as used in the drive circuit of FIG. 1.

The structure of one of the Ćuk converters is shown in FIG. 2 of the accompanying drawings. The converter is generally depicted as 6. The converter comprises a transformer 15 with input 14 and output 16 windings. The transformer divides the converter into input and output halves. On the input side the converter has a set of input terminals 11 across which the input 3 is connected. Connected in series with a first input terminal 11a is provided in order an input inductor 12, an input energy storage capacitor 13 and one end of the input winding 14 of the transformer 15. The other end of the input winding 14 is connected to the other, second, input terminal 11b.

A switch 17 such as a FET controllably connects or disconnects the junction between the input inductor and the input capacitor to the second input terminal 11b. The opening and closing of the switch 17 can be controlled by applying signals to input control terminal 18; in use one of the signals 9a, 9b, 9c would be applied to this terminal.

On the output side of the converter, an output energy storage capacitor 19 is connected between one end of the output winding 16 and one terminal of an output inductor 20. The other terminal of the output inductor 20 is connected to a first output terminal 21a. The end of the output winding not connected to the capacitor 19 is connected to a second output terminal 21b; first and second output terminals form a set 21.

An output switch 23 such as a FET is connected between the junction 22 between output capacitor and output inductor 20 to selectively connect that junction 22 to the second output terminal. The switch 23 can be controlled by applying control signals to control terminal 24. In use, one of signals 9a', 9b', 9c' would be applied to this terminal. A smoothing capacitor 25 is connected across the output terminals for output voltage filtering.

In use, a DC supply is connected across input terminals 11; convention is that a positive voltage is applied to the first terminal 11a. Switches 17 and 23 are controlled such that when one is open, the other is closed. When output switch 23 is closed (and hence input switch 17 is open), input capacitor 13 charges through the input winding 14 of the transformer 15. This induces a voltage in the output winding 16, which charges output capacitor 19.

When input switch 17 is closed and output switch 23 opened, the input capacitor 13 discharges through the input winding 14 (in the opposite direction to that in which it charged) and hence generates a voltage in output winding 16. As switch 23 is closed, the voltages generated in the output winding 16 and that across output capacitor 19 act together to generate a current in output inductor 20 and hence to a load connected across the output terminals 21. As the switches are repeatedly switched on and off, the output inductor ensures that a steady current is provided to the load, and the input inductor ensures that a steady current is drawn from the DC supply.

In an alternative embodiment, the output switch can be replaced by a diode, biased to allow current to flow from the end of the transformer connected to the second output terminal 21b to the junction 22. The diode would therefore only conduct when switch 17 was open.

Figure 3:
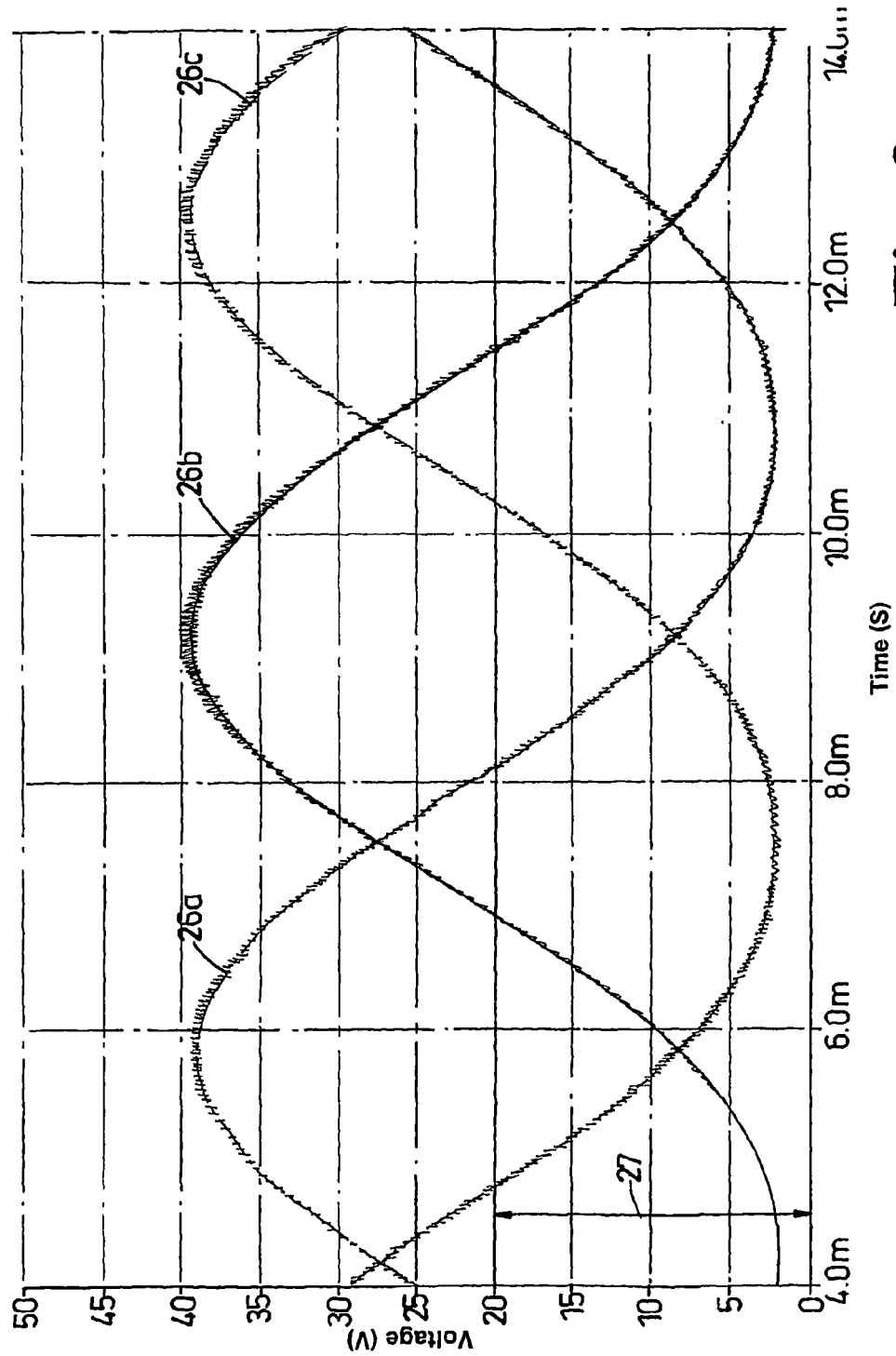
FIG. 3 shows the waveforms generated by the converters of FIG. 1.

By varying the duty ratio of the switches—that is the ratio of the time a particular one of the switches is open to the time it is closed—the voltage generated at the output can be varied. This is therefore a form of Pulse Width Modulation (PWM) of the control signals to the switches. A generally sinusoidal waveform can be generated by the converters, as can be seen in the example of FIG. 3 of the accompanying drawings.

The three traces 26a, 26b and 26c show the voltages generated at the outputs of the drive circuit 5a, 5b, 5c respectively. It can be seen that these are of generally sinusoidal form with a common DC offset 27. This is necessary as Ćuk converters cannot generate voltages of differing polarities; they are either inverting or non-inverting. The Ćuk converter shown in FIG. 2 is a non-inverting converter, as the output and input windings of the transformer are oppositely wound.

The DC offset 27 is unimportant, as the voltages will be applied to three phases of the motor 10; it is the difference in voltages applied which is important. Given the sinusoidal nature of the signals generated and the common DC offset, the difference between any two of the example signals depicted will be a sinusoidal signal with little if any DC offset.

Figure 4:
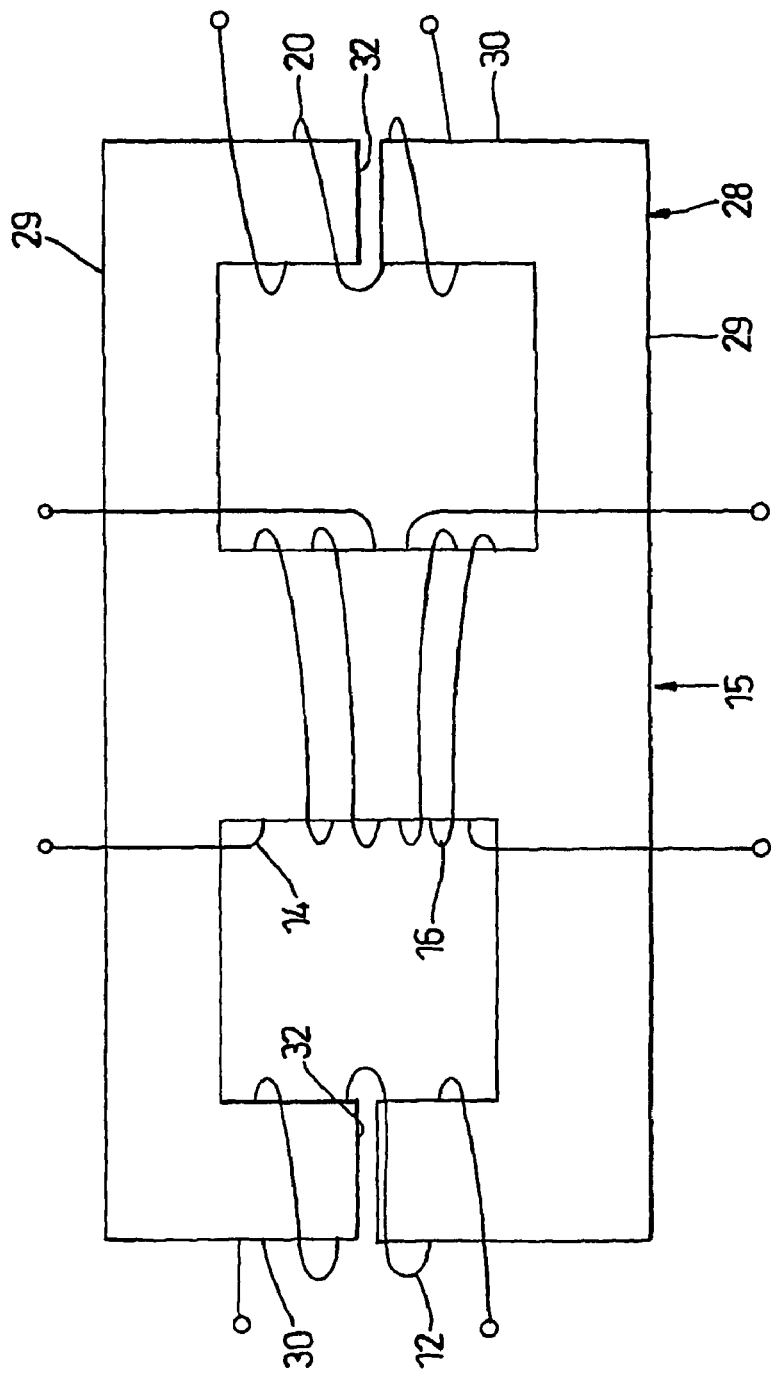
FIG. 4 shows the windings of the inductors and transformer of the Ćuk converter of FIG. 2 about a common core.

Ripple current in the inductors 12, 20 can be steered to either the input or output by introducing leakage inductance in series with either the input 12 or output 20 inductors. In order to reduce undesired ripple in output or input voltages, the input 12 and output 20 inductors and the transformer 15 windings can all be wound about a common core. This arrangement is shown schematically in FIG. 4 of the accompanying drawings. A core 28 of ferrite materials is of the form of a rectangular figure-of-eight, defining two side pieces 29 with two end limbs 30 and a centre limb 31 joining the side pieces together. The input 12 and output inductors 20 are formed as coils of wire wrapped round each of the end pieces. A gap 32 is formed in each of the outer limbs 30.

The transformer 15 is formed as two windings—the input winding 14 and the output winding 16—wrapped around the central limb 31. Accordingly, any ripple currents tend to cancel and undesired ripple in the output and input voltages is reduced and perhaps eliminated.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

The invention claimed is:

1. A drive circuit for a motor having a plurality of phases, the drive circuit comprising:
    an input for a DC signal;
    a plurality of phase outputs, the circuit being arranged to provide at each of the phase outputs, in use, current to one phase of the motor;
    a plurality of converters, with a single converter associated with each phase output, each converter being arranged to take as an input a DC signal and output a signal having an AC component with a higher voltage magnitude than that of the DC signal input to the converter, each converter including a pair of switches; and
    a control device arranged to, in use, apply control signals to the switches of each of the converters, the control device being arranged to switch the switches in use at a certain frequency, and to vary the duty ratio of such switches in order to generate the AC component.

2. The drive circuit of claim 1, wherein the circuit is arranged such that, in use, the signal output by each phase includes a DC offset.

3. The drive circuit of claim 2, wherein, in use, the DC offset generated is the same for each phase output.

4. The drive circuit of claim 1, wherein the control device includes an input for a torque demand signal indicative of an amount of torque to be generated by the motor and further wherein the control device is arranged to vary the duty ratio of the switching of the switch in order to change the amplitude of the AC component, in response to a change in the torque demand signal.

5. The drive circuit of claim 1, wherein each converter includes a Ćuk converter.

6. The drive circuit of claim 5, wherein each Ćuk converter includes an input inductance coupled to the input of the converter and an output inductance coupled to the output of the converter and further wherein an energy storage capacitor is coupled in series between the input and output inductances.

7. The drive circuit of claim 6, wherein the Ćuk converter also includes a transformer coupled in series between the input and output inductances.

8. The drive circuit of claim 7, wherein the transformer has an input winding coupled to the input inductance and an output winding coupled to the output inductance.

9. The drive circuit of claim 8, wherein the converter includes two energy storage capacitors, one coupled to the input winding and one to the output winding.

10. The drive circuit of claim 6, wherein the input and output inductances are wound on a common core.

11. The drive circuit of claim 10, wherein the parts of the common core around which the input and output inductances are wound have a gap therein.

12. The drive circuit of claim 10, when dependent from claim 8, in which the common core is also the core of the transformer.

13. An Electric Power Assisted Steering (EPAS) system comprising:
- a DC voltage source;
- a motor having a plurality of phases;
- a motor drive circuit having an input connected to the DC voltage source and a plurality of outputs with each output connected to a phase of the motor, the drive circuit also including a plurality of converters, with a single converter associated with each phase output, each converter being arranged to take as an input a DC signal and output a signal having an AC component with a higher voltage magnitude than that of the DC signal input to the converter, each converter including a pair of switches; and
- a control device arranged to, in use, apply control signals to the switches of each of the converters, the control device being arranged to switch the switches in use at a certain frequency, and to vary the duty ratio of such switches in order to generate the AC component.

14. The EPAS system of claim 13 wherein the EPAS system is installed in a vehicle, and the DC power supply is a vehicle battery.

15. A drive circuit for a motor having a plurality of phases, the drive circuit comprising:
- an input for a DC signal;
- a plurality of phase outputs, the circuit being arranged to provide at each of the phase outputs, in use, current to one phase of the motor, in which there is provided a converter for each phase output, each converter being arranged to take as an input a DC signal and output a signal having an AC component with a higher voltage magnitude than that of the DC signal input to the converter, in which, in use, each converter boosts the DC signal to a higher voltage, each converter including a pair of switches; and
- a control device arranged to apply control signals to the switches of each of the converters, the control device being arranged to switch the switches in use at a certain frequency, and to vary the duty ratio of such switches in order to generate the AC component without chopping the booster signal to form the output signal.

* * * * *